(12) United States Patent
Fleischmann et al.

(10) Patent No.: US 11,787,938 B2
(45) Date of Patent: Oct. 17, 2023

(54) THREE-DIMENSIONAL (3D) PRINTING

(71) Applicant: Hewlett-Packard Development Company, L.P., Spring, TX (US)

(72) Inventors: Carolin Fleischmann, San Diego, CA (US); Rachael Donovan, San Diego, CA (US); Shannon Reuben Woodruff, San Diego, CA (US); Yi Feng, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/837,291

(22) Filed: Jun. 10, 2022

(65) Prior Publication Data
US 2022/0298369 A1 Sep. 22, 2022

Related U.S. Application Data

(62) Division of application No. 16/490,917, filed as application No. PCT/US2017/062345 on Nov. 17, 2017, now Pat. No. 11,427,720.

(51) Int. Cl.
*B29C 64/165* (2017.01)
*C08L 77/04* (2006.01)
(Continued)

(52) U.S. Cl.
CPC ............ *C08L 77/04* (2013.01); *B29C 64/165* (2017.08); *B33Y 10/00* (2014.12); *B33Y 70/00* (2014.12);
(Continued)

(58) Field of Classification Search
None
See application file for complete search history.

(56) References Cited

U.S. PATENT DOCUMENTS

| | | | | |
|---|---|---|---|---|
| 4,749,736 A | * | 6/1988 | Khanna | C08K 5/20 524/451 |
| 6,214,277 B1 | | 4/2001 | Saigo | |

(Continued)

FOREIGN PATENT DOCUMENTS

| | | |
|---|---|---|
| CN | 104448805 | 3/2015 |
| WO | WO-2016-175 748 A1 * | 11/2016 |

(Continued)

OTHER PUBLICATIONS

Telen, L et al., Random Copolymers From Polyamide 11 and Polyamide 12 by Reactive Extrusion: Synthesis, Eutectic Phase Behavior, and Polymorphism, 2016, http://pubs.acs.org/doi/abs/10.1021/acs.macromol.5b00976.

*Primary Examiner* — Mohammad M Ameen
(74) *Attorney, Agent, or Firm* — HP Inc. Patent Department

(57) ABSTRACT

Compositions including polyamides and methods of employing compositions including polyamides are described herein. For instance, composition for three-dimensional (3D) printing can include a polymer build material comprising of at least two polyamides including a first polyamide and a second polyamide, where the first polyamide is present in an amount ranging of from about 95% to about 99% of a total weight of the polymer build material and where the second polyamide is present in an amount ranging of from about 1% to about 5% of the total weight of the polymer build material.

18 Claims, 10 Drawing Sheets

(51) Int. Cl.
*B33Y 10/00* (2015.01)
*B33Y 70/00* (2020.01)
*C09D 11/102* (2014.01)
*C09D 11/30* (2014.01)
*B29K 77/00* (2006.01)

(52) U.S. Cl.
CPC ............ *C09D 11/102* (2013.01); *C09D 11/30* (2013.01); *B29K 2077/00* (2013.01)

(56) References Cited

U.S. PATENT DOCUMENTS

| | | |
|---|---|---|
| 9,527,242 B2 | 12/2016 | Rodgers et al. |
| 9,738,031 B2 | 8/2017 | Mikulak et al. |
| 9,744,722 B2 | 8/2017 | Rodgers |
| 2002/0136851 A1 | 9/2002 | Kollaja |
| 2003/0130406 A1 | 7/2003 | Van et al. |
| 2010/0307626 A1 | 12/2010 | Martens et al. |
| 2014/0329953 A1 | 11/2014 | Paternoster |
| 2016/0312037 A1 | 10/2016 | Zhao et al. |

FOREIGN PATENT DOCUMENTS

| | | | |
|---|---|---|---|
| WO | WO-2016 175748 A1 | * | 11/2016 |
| WO | WO-2016175748 A1 | | 11/2016 |

\* cited by examiner

THREE-DIMENSIONAL (3D) PRINTING

PRIORITY INFORMATION

This application is a divisional of U.S. National Stage application Ser. No. 16/490,917 filed on Sep. 4, 2019, which claims priority to the International Application No. PCT/US2017/062345 filed on Nov. 17, 2017. The contents of which are incorporated herein by reference in its entirety.

BACKGROUND

Three-dimensional (3D) printing may be an additive printing process used to make three-dimensional solid parts from a digital model. 3D printing may be used in product prototyping, mold generation, mold master generation, and manufacturing. Some 3D printing techniques are considered additive processes because they involve the application of successive layers of components. 3D printing may use annealing and fusing of the building material, which may be accomplished using light polymerization, thermal fusing, heat-assisted extrusion, melting, and/or chemical binding techniques.

BRIEF DESCRIPTION OF THE DRAWINGS

Features of examples of the present disclosure will become apparent by reference to the following detailed description and drawings, in which like reference numerals correspond to similar, though perhaps not identical, components. For example, reference numeral 116 may refer to element 116 in FIG. 1 and an analogous element may be identified by reference numeral 216 in FIG. 2. For the sake of brevity, reference numerals or features having a previously described function may or may not be described in connection with other drawings in which they appear.

DETAILED DESCRIPTION

Figure 1:
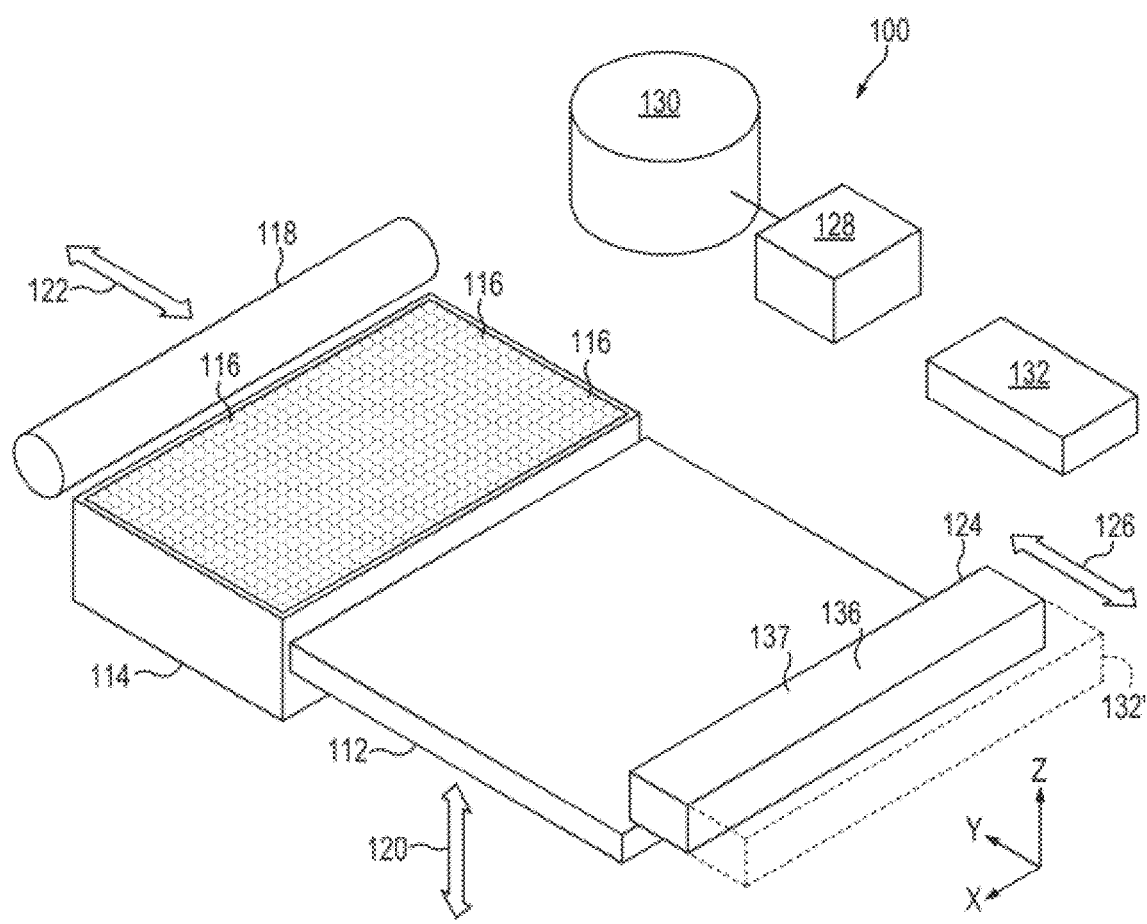
FIG. 1 is a simplified isometric view of an example of a 3D printing system disclosed herein.

In an example of an three-dimensional (3D) printing, a layer of a polymer build material (also referred to as build material particles) is exposed to radiation, but a selected region (in some instances less than the entire layer) of the polymer build material is fused and hardened to become a layer of a 3D part(s) or object(s).

An infrared radiation (IR) absorbing fusing agent (e.g., containing carbon black as the IR absorbing species) can be selectively deposited on the selected region of the polymer build material. The fusing agent(s) is capable of penetrating into the layer of the build material and spreading onto the exterior surface of the polymer build material particles. This fusing agent is capable of absorbing IR radiation and converting the absorbed radiation to thermal energy, which in turn melts or fuses the polymer build material that is in contact with the fusing agent. This causes the polymer build material to fuse to form the layer of the 3D part.

As used herein, the term "composition for 3D printing" refers to a polymer build material. In some examples the polymer build material can comprise at least two polyamides. In some examples, the polymer build material can comprise at least two polyamides and at least one semi-crystalline thermoplastic polymer.

As used herein, the term "3D printed object" refers to a patterned 3D printed object that has been exposed to a heating process, as detailed herein. It is understood that the polymer build material is patterned with a fusing agent to achieve selective IR absorption or alter other properties. Moreover, it is to be understood that any polymer build material that is not patterned with the fusing agent is not considered to be part of the patterned 3D printed object, even if it is adjacent to or surrounds the patterned 3D object.

As used herein, the terms "fused 3D printed object" or "extracted fused 3D printed object" each refer to the 3D printed object having been subjected to a fusing temperature.

As used herein, the terms "3D printed part," "fused 3D printed object", "3D part," "part," "3D printed object," "3D object," or "object" may be a completed 3D printed part or a layer of a 3D printed part.

As used herein, the term "xy orientation" refers to printing the layers of a 3D printed object in the pull direction of the tensile specimen.

As used herein, the term "z orientation" refers to printing the layers of a 3D printed object perpendicular to the pull direction of the tensile specimen.

As used herein, "(s)" at the end of some terms indicates that those terms/phrases may be singular in some examples or plural in some examples. It is to be understood that the terms without "(s)" may be also be used singularly or plurally in many examples.

In some examples, polymer build material may be fused or annealed in the build area platform of the 3D printer. For example, the polymer build material may be exposed to elevated temperatures for extended periods of time to form a 3D printed object. In some examples, polymer build material with high molecular symmetry may form larger crystal spherulites in 3D printed objects, which may appear more brittle. In some examples, the addition of components in the polymer build material that reduce the system's symmetry may hinder the growth of crystal spherulites in 3D printed objects, may reduce embrittlement, and may increase the strain at break of the formed 3D printed object.

As such, a 3D printed object, as described herein, may rely on the addition of components in the polymer build material to disrupt the material's crystal structure, reduce embrittlement, and increase the strain at break.

Referring now to FIG. 1, a simplified isometric view of an example of 3D printing system 100 is depicted. It is to be understood that the 3D printing system 100 may include additional components and that some of the components described herein may be removed and/or modified. Furthermore, components of the 3D printing system 100 depicted in FIG. 1 may not be drawn to scale and thus, the 3D printing system 100 may have a different size and/or configuration other than as shown therein.

Figure 2A:
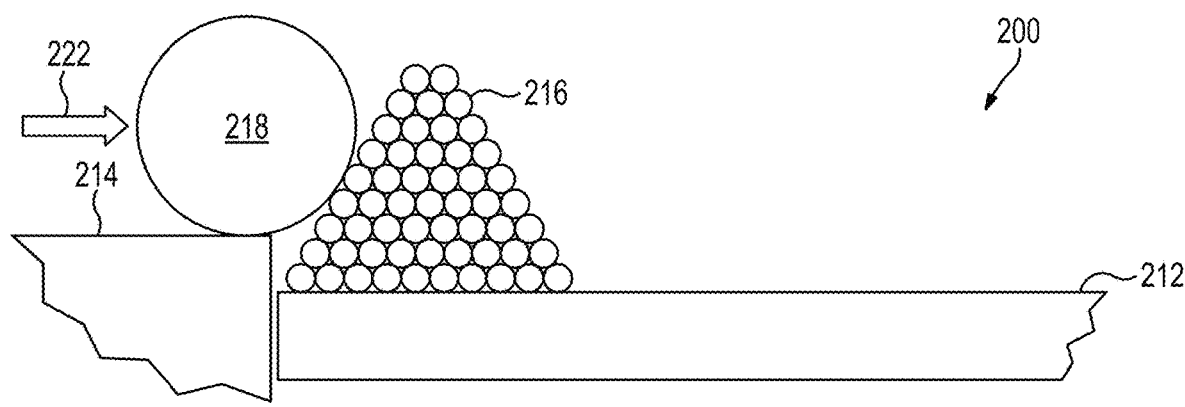
FIGS. 2A, 2B, 2C, 2D, 2F, and 2E are schematic views depicting the formation of a patterned 3D printed object, a fused 3D printed object, and an extracted fused 3D printed object using examples of a 3D printing method disclosed herein.
Figure 2B:
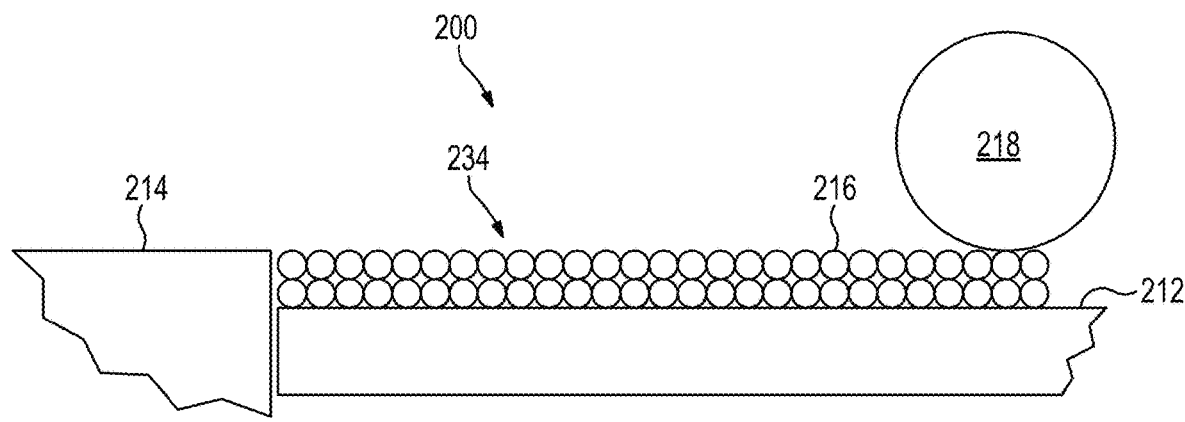
Figure 2C:
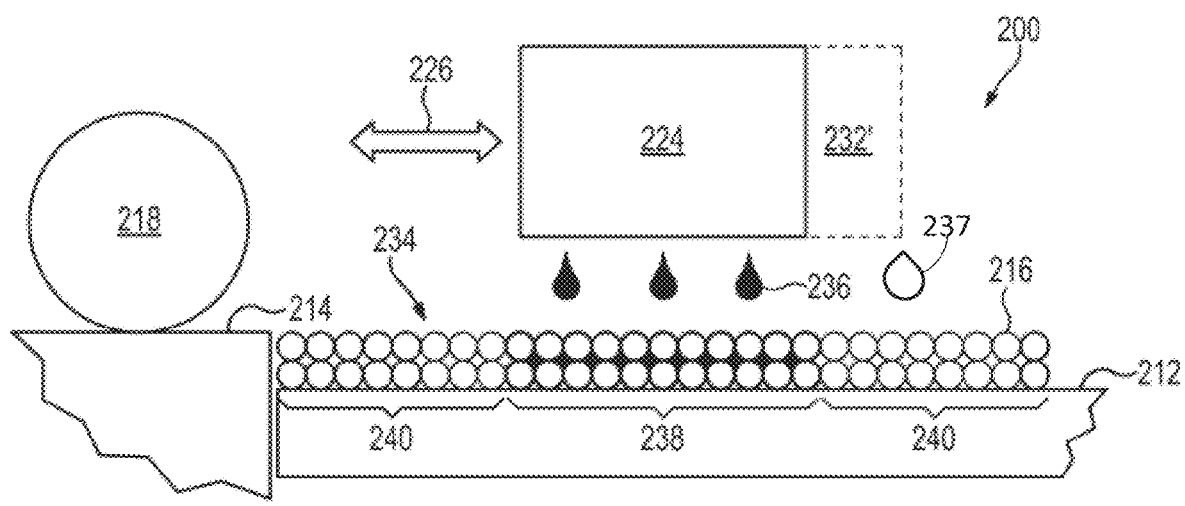
Figure 2D:
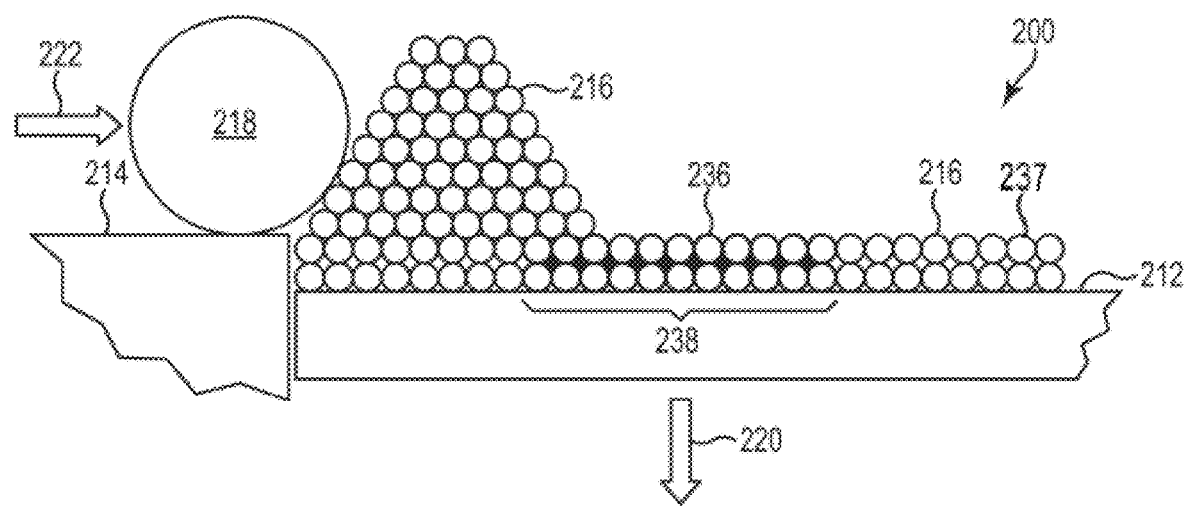
Figure 2E:
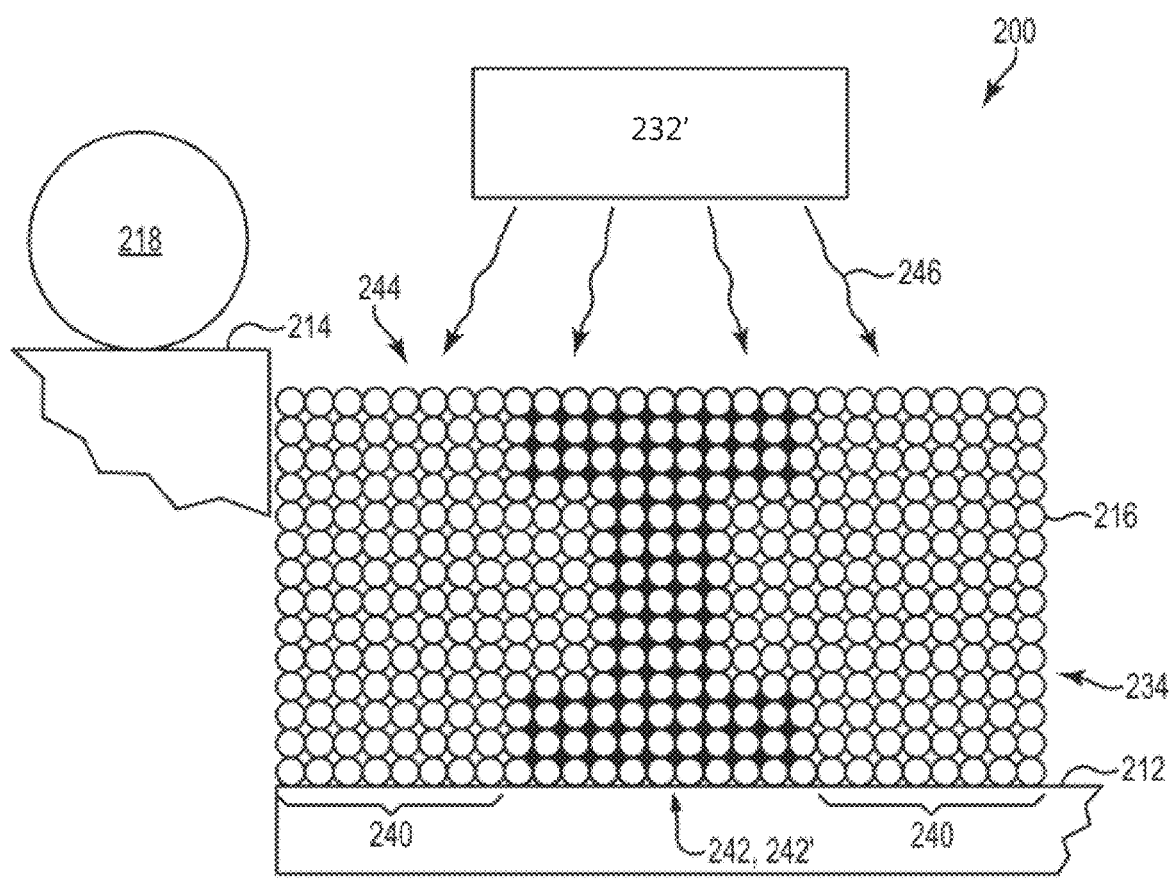

The 3D printing system 100 includes a supply 114 of polymer build material 116; a build material distributor 118; an inkjet applicator 124 for selectively dispensing a fusing agent 136 and a detailing agent 137; at least one heat source 132', 132; a controller 128; and a non-transitory computer readable medium (not illustrated for ease of illustration) having stored thereon computer executable instructions to cause the controller 128 to: utilize the build material distributor 118 and the inkjet applicator 124 to iteratively form multiple layers (e.g., layers 234 as depicted in FIG. 2B) of polymer build material 116 which are applied by the build material distributor 118 and have received the fusing agent 136 and the detailing agent 137, as described herein, thereby creating a patterned 3D printed object (e.g., a patterned 3D printed object 242' as depicted in FIG. 2E). In some examples, the at least one heat source 132', 132 can heat (e.g., heat 246 as illustrated in FIG. 2E) the patterned 3D printed object above the polymer build material 116 melt temperature, for instance, thereby substantially removing solvents and/or co-solvent in the fusing agent and/or fusing the polymer build material 116 (fusing the polymer build material and the selectively applied fusing agent 136) to create a fused 3D printed object.

As shown in FIG. 1, the printing system 100 includes a build area platform 112, the build material supply 114 containing polymer build material 116, and the build material distributor 118.

The build area platform 112 receives the polymer build material 116 from the build material supply 114. The build area platform 112 may be integrated with the printing system 100 or may be a component that is separately insertable into the printing system 100. For example, the build area platform 112 may be a module that is available separately from the printing system 100. The build area platform 112 that is shown is also one example, and could be replaced with another support member, such as a platen, a fabrication/print bed, a glass plate, or another build surface.

The build area platform 112 may be moved in a direction as denoted by the arrow 120, for instance, along the z-axis, so that polymer build material 116 may be delivered to the platform 112 or to a previously formed layer of polymer build material 116 (see arrow 220 as depicted in FIG. 2D). In an example, when the polymer build material 116 is to be delivered, the build area platform 112 may be programmed to advance (e.g., downward) enough so that the build material distributor 118 can push the polymer build material 116 onto the platform 112 to form a layer of the polymer build material 116 thereon (see, e.g., layer 234 as depicted in FIGS. 2A and 2B). The build area platform 112 may also be returned to its original position, for example, when a new part is to be built.

The build material supply 114 may be a container, bed, or other surface that is to position the polymer build material 116 between the build material distributor 118 and the build area platform 112. In some examples, the build material supply 114 may include a surface upon which the polymer build material 116 may be supplied, for instance, from a build material source (not shown) located above the build material supply 114. Examples of the build material source may include a hopper, an auger conveyer, or the like. In some examples, the build material supply 114 may include a mechanism (e.g., a delivery piston) to move the polymer build material 116 from a storage location to a position to be spread onto the build area platform 112 or onto a previously formed layer of polymer build material 116.

The build material distributor 118 may be moved in a direction as denoted by the arrow 122, for example, along the y-axis, over the build material supply 114 and across the build area platform 112 to spread a layer of the polymer build material 116 over the build area platform 112. The build material distributor 118 may also be returned to a position adjacent to the build material supply 114 following the spreading of the polymer build material 116. The build material distributor 118 may be a blade (e.g., a doctor blade), a roller, a combination of a roller and a blade, and/or any other device capable of spreading the polymer build material 116 over the build area platform 112. For instance, the build material distributor 118 may be a counter-rotating roller.

The polymer build material 116 may be any particulate polymer material that contains at least two polyamides. In some examples, the polymer build material 116 may be a powder. In some examples, discrete polymer build material 116 powder particles should no longer be visible in the fused 3D printed object. In some examples the powder may be formed from, or may include, short fibers that may, for example, have been cut into short lengths from long strands or threads of material During fusing or melting the fusing agent 136, absorbs IR radiation, which causes portions of the polymer build material 116 that are covered with fusing agent to heat above the polymer build material's melting temperature, thus causing the polymer build material particles to melt and coalesce thereby forming one layer of a fused 3D printed object.

In some examples, the polymer build material 116 can comprise at least two polymers, which can be a powder, a liquid, a paste, or a gel. Examples of polymer(s) can include semi-crystalline thermoplastic materials with a wide processing window of greater than 5° C. (e.g., the temperature range between the melting onset and the re-crystallization onset). In some examples, the polymer build material 116 can comprise polymers that are miscible. Some specific examples of the polymer(s) can include polyamides (PAs) (e.g., PA 11/nylon 11, PA 12/nylon 12, PA 6/nylon 6, PA 8/nylon 8, PA 9/nylon 9, PA 6,6/nylon 6,6, PA 612/nylon 6,12, PA 8,12/nylon 8,12, PA 9,12/nylon 9,12, or combinations thereof). Other specific examples of the polymer(s) can include polyethylene and polyethylene terephthalate (PET). Still other examples of build materials can include polystyrene, polyacetals, polypropylene, polycarbonate, polyester, thermal polyurethanes, other engineering plastics, and blends of any two or more of the polymers listed herein. Core shell polymer particles of these materials may also be used.

In various examples, the polymer build material 116 comprises at least two polyamides. In some examples, the polymer build material 116 can be a combination of polyamide 12, polyamide 11, and at least one semi-crystalline thermoplastic polymer with a wide processing window of greater than 5° C. In various examples, the polymer build material 116 comprises polyamide 12 and polyamide 11. In some examples, polyamide 12 and polyamide 11 make up 100% of the total weight of the polymer build material.

As used herein, the term "semi-crystalline" refers to a semi-crystalline material or a semi-crystalline polymer that contains organized and tightly packed molecular structures (crystalline domains) as well as randomly assembled amorphous domains.

In various examples, a method for making a composition for 3D printing can include polymer build material 116. In some examples, a method of making a composition for three-dimensional (3D) printing can comprise:

dry blending a polymer build material comprising at least two polyamides including a first polyamide and a second polyamide, wherein the first polyamide is present in an amount ranging of from about 95% to about 99% of a total weight of the polymer build material, wherein the second polyamide is present in an amount ranging of from about 1 to about 5% of the total weight of the polymer build material.

As used herein, the term "dry blending" refers to any process which blends the components of the composition substantially uniformly.

The polymer(s) can have a melting point ranging from about 50° C. to about 300° C. As examples, the polymer(s) may be a polyamide having a melting point of 190° C., or thermal polyurethanes having a melting point ranging from about 100° C. to about 195° C., among other possibilities. In some examples, the polymer build material can have a glass transition temperature of from about 25° C. to about 125° C. and can have a thermal decomposition temperature of from about 250° C. to about 600° C. As used herein the term "glass transition temperature" refers to the temperature over which glass transition occurs. As used herein the term "thermal decomposition temperature" refers to a temperature at which the substance chemically decomposes. The glass transition temperature is lower than the thermal decomposition temperature.

The polymer(s) can be made up of similarly sized particles or differently sized particles. In some examples, the polymer(s) can include particles of two different sizes. The term "size," as used herein with regard to the build material, refers to the diameter of a spherical particle, or the average diameter of a non-spherical particle (e.g., the average of multiple diameters across the particle). In an example, the average size of the polymer(s) particles can range from about 0.1 μm to about 100 μm, or from about 1 μm to about 80 μm, or from about 5 μm to about 50 μm. As another example, the average particle size of the particles of the polymer build material 116 may range from about 1 μm to about 200 μm.

In various examples, any polymer build material 116 may be used that is in powder form at the outset of the 3D printing method(s) disclosed herein. As such, the melting point, solidus temperature, and/or peritectic temperature of the polymer build material 116 may be above the temperature of the environment in which the patterning portion of the 3D printing method is performed (e.g., above 80° C. and/or above 140° C.).

In various examples, a composition for 3D printing can include polymer build material 116. In some examples, a composition for three-dimensional (3D) printing can comprise:

a polymer build material comprising at least two polyamides including a first polyamide and a second polyamide, wherein the first polyamide is present in an amount ranging of from about 95% to about 99% of a total weight of the polymer build material; and wherein the second polyamide is present in an amount ranging of from about 1 to about 5% of the total weight of the polymer build material.

As mentioned, the first polyamide of the at least two polyamides can be present in an amount of from about 95% to about 99% of a total weight of the build material, among other possibilities. For instance, in some examples, the first polyamide is present in the build material in an amount of from about 95 wt % to about 99 wt % based on the total weight of the build material, or from about 96 wt % to about 99 wt % based on the total weight of the build material, or from about 97 wt % to about 99 wt % based on the total weight of the build material, or from about 98 wt % to about 99 wt % based on the total weight of the build material, or from about 96 wt % to about 98 wt % based on the total weight of the build material, or from about 97 wt % to about 98 wt % based on the total weight of the build material, or less than about 99 wt % based on the total weight of the build material, or less than about 98 wt % based on the total weight of the build material, or less than about 97 wt % based on the total weight of the build material, or less than about 96 wt % based on the total weight of the build material, or greater than about 95 wt % based on the total weight of the build material, or greater than about 96 wt % based on the total weight of the build material, or greater than about 97 wt % based on the total weight of the build material, or greater than about 98 wt % based on the total weight of the build material.

As mentioned, the second polyamide of the at least two polyamides can be present in an amount of from about 1% to about 5% of a total weight of the build material, among other possibilities. For instance, in some examples, the second polyamide is present in the build material in an amount of from about 1 wt % to about 5 wt % based on the total weight of the build material, or from about 2 wt % to about 5 wt % based on the total weight of the build material, or from about 3 wt % to about 5 wt % based on the total weight of the build material, or from about 4 wt % to about 5 wt % based on the total weight of the build material, or less than about 5 wt % based on the total weight of the build material, or less than about 4 wt % based on the total weight of the build material, or less than about 3 wt % based on the total weight of the build material, or less than about 2 wt % based on the total weight of the build material, or greater than about 1 wt % based on the total weight of the build material, or greater than about 2 wt % based on the total weight of the build material, or greater than about 3 wt % based on the total weight of the build material, or greater than about 4 wt % based on the total weight of the build material.

As shown in FIG. 1, the printing system 100 also includes an applicator 124, which may contain the fusing agent 136 and the detailing agent 137 disclosed herein. In some examples, the fusing agent 136 may include other additives, depending, in part, upon the applicator 124 that is to be used to dispense the fusing agent 136. The fusing agent 136 includes at least the liquid vehicle and the IR absorbing species. In some instances, the fusing agent 136 comprises the liquid vehicle and the IR absorbing species, without any other components.

As mentioned above, the fusing agent 136 includes the IR absorbing compound (e.g. the pigment carbon black) and the liquid vehicle. As used herein, "liquid vehicle" may refer to the liquid in which the IR absorbing compound is dispersed to form the fusing agent 136. A wide variety of liquid vehicles, including aqueous and non-aqueous vehicles, may be used with the fusing agent 136. In some instances, the liquid vehicle comprises a solvent with no other components.

In other examples, the fusing agent 136 may include other ingredients, depending, in part, upon the applicator 124 that is to be used to dispense the fusing agent 136. Examples of other suitable fusing agent components include co-solvent(s), surfactant(s), antimicrobial agent(s), anti-kogation agent(s), viscosity modifier(s), pH adjuster(s) and/or sequestering agent(s). The presence of a co-solvent and/or a surfactant in the fusing agent 136 may assist in obtaining a particular wetting behavior with the polymer build material 116.

The solvent may be water or a non-aqueous solvent (e.g., ethanol, acetone, n-methyl pyrrolidone, or aliphatic hydrocarbons). In some examples, the fusing agent 136 comprises the IR absorbing compound and the solvent (with no other components). In these examples, the solvent makes up the balance of the fusing agent 136.

Classes of organic co-solvents that may be used in the water-based fusing agent 136 include aliphatic alcohols, aromatic alcohols, diols, glycol ethers, polyglycol ethers, lactams such as 2-pyrrolidone, caprolactams, formamides, acetamides, glycols, and long chain alcohols. Examples of these co-solvents include aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like.

Examples of some suitable co-solvents include water-soluble high-boiling point solvents (i.e., humectants), which have a boiling point of at least about 120° C., or higher. Some examples of high-boiling point solvents include 2-pyrrolidone (boiling point of about 245° C.), 2-methyl-1,3-propanediol (boiling point of about 212° C.), and combinations thereof. The co-solvent(s) may be present in the fusing agent 136 in a total amount ranging from about 1 wt % to about 50 wt % based upon the total wt % of the fusing agent 136, depending upon the architecture of the applicator 124.

Surfactant(s) may be used to improve the wetting properties and the flow properties of the fusing agent 136. Examples of suitable surfactants include a self-emulsifiable, nonionic wetting agent based on acetylenic diol chemistry (e.g., SURFYNOL® SEF from Air Products and Chemicals, Inc.), a nonionic fluorosurfactant (e.g., CAPSTONE® fluorosurfactants from DuPont, previously known as ZONYL FSO), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6 or TERGITOL™ 15-S-7 from The Dow Chemical Company). In some examples, it may be useful to utilize a surfactant having a hydrophilic-lipophilic balance (HLB) less than 10.

Whether a single surfactant is used or a combination of surfactants is used, the total amount of surfactant(s) in the fusing agent 136 may range from about 0.01 wt % to about 10 wt % based on the total wt % of the fusing agent 136. In another example, the total amount of surfactant(s) in the fusing agent 136 may range from about 0.5 wt % to about 2.5 wt % based on the total wt % of the fusing agent 136.

The liquid vehicle may also include antimicrobial agent(s). Suitable antimicrobial agents include biocides and fungicides. Example antimicrobial agents may include the NUOSEPT™ (Troy Corp.), UCARCIDE™ (Dow Chemical Co.), ACTICIDE® M20 (Thor), and combinations thereof. Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from Dow Chemical Co.). The biocide or antimicrobial may be added in any amount ranging from about 0.05 wt % to about 0.5 wt % (as indicated by regulatory usage levels) with respect to the total wt % of the fusing agent 136.

An anti-kogation agent may be included in the fusing agent 136. Kogation refers to the deposit of dried fusing agent 136 on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol). Whether a single anti-kogation agent is used or a combination of anti-kogation agents is used, the total amount of anti-kogation agent(s) in the fusing agent 136 may range from greater than 0.20 wt % to about 0.62 wt % based on the total wt % of the fusing agent 136. In an example, the oleth-3-phosphate is included in an amount ranging from about 0.20 wt % to about 0.60 wt %, and the low molecular weight polyacrylic acid polymer is included in an amount ranging from about 0.005 wt % to about 0.03 wt %.

Buffer solutions may be used to control the pH of the fusing agent 136. From 0.01 wt % to 2 wt % of each of these components, for example, can be used. Viscosity modifiers and buffers may also be present, as well as other known additives to modify properties of the fusing agent 136. Such additives can be present in amounts ranging from about 0.01 wt % to about 20 wt %.

The detailing agent 137 includes an aqueous vehicle. As used herein, "aqueous vehicle" may refer to the aqueous fluid that enables the detailing agent 137 to be delivered by the applicator 124. The detailing agent 137 includes a colorant that does not absorb the infrared radiation used for fusing. The detailing agent 137 may be applied outside of the edge boundary (i.e., the outermost portions where the fusing agent 136 is selectively deposited onto the build material during 3D printing) of the 3D printed object during fusing. As such, the colorant in the detailing agent does not contribute to the 3D printed object growth, but rather contributes to edge acuity of the 3D printed object.

The detailing agent 137 also serve to reduce the degree of coalescence, or prevent coalescence of a portion of the polymer build material 116 on which the detailing agent 137 has been delivered or has penetrated by providing an evaporative cooling effect. The cooling effect of the detailing agent 137 reduces the temperature of the polymer build material 116 containing the detailing agent 137 during fusing. Since the polymer build material 116, with detailing agent 137 applied thereto, has a reduced temperature, the coalescence bleed may be reduced or prevented. As such, the detailing agent 137 contributes to the generation of dimensionally accurate 3D printed objects in real-time without the need for post-object mechanical refining processes (e.g., tumbling, stone polishing, etc.).

In some examples, the detailing agent 137 may include other ingredients, depending, in part, upon the applicator 124 that is to be used to dispense the detailing agent 137. Examples of other suitable detailing agent components include co-solvent(s), surfactant(s), anti-kogation agent(s), and/or biocide(s).

The presence of surfactant in the detailing agent 137 may assist in obtaining a particular wetting behavior with the polymer build material 116. In some example, the surfactant may be any surfactant that has a hydrophilic-lipophilic balance (HLB) of less than 10. Examples of suitable surfactants include a self-emulsifiable, nonionic wetting agent based on acetylenic diol chemistry (e.g., SURFYNOL® SEF from Air Products and Chemicals, Inc.), a nonionic, acetylenic diol surface active agent (e.g., SURFYNOL® 104 from Air Products and Chemicals, Inc.), a nonionic fluorosurfactant (e.g., CAPSTONE® fluorosurfactants from DuPont, previously known as ZONYL FSO), a secondary alcohol ethoxylate, nonionic surfactant (e.g., TERGITOL™ 15-S-9, TERGITOL™ 15-S-7, TERGITOL™ 15-S-5, each of which is available from The Dow Chemical Co.), a nonionic, ethoxylated low-foam wetting agent (e.g., SURFYNOL® 440 from Air Products and Chemicals, Inc.), an ethoxylated wetting agent and molecular defoamer (e.g., SURFYNOL® 420 from Air Products and Chemicals, Inc.), an alkoxylated alcohol (e.g., TEGO® Wet 510 from Evonik Industries AG), and combinations thereof.

Whether a single surfactant is used or a combination of surfactants is used, the total amount of surfactant(s) in the detailing agent 137 may range from about 0.02 wt % to about 1.00 wt % with respect to the total weight of the detailing agent 137. In some example, the total amount of surfactant(s) in the detailing agent 137 may range from about 0.10 wt % to about 5.0 wt % based on the total wt % of the detailing agent 137.

The aqueous vehicle may also include co-solvent(s). The detailing agent 137 also includes the co-solvent(s). The co-solvent is present in an amount ranging from about 3.00 wt % to about 5.00 wt % based on the total weight of the detailing agent 137. Some examples of suitable co-solvents include tetraethylene glycol, tripropylene glycol methyl ether, dipropylene glycol methyl ether, tripropylene glycol butyl ether, dipropylene glycol butyl ether, triethylene glycol butyl ether, 1,2-hexanediol, 2-hydroxyethyl-2-pyrrolidinone, 2-pyrrolidinone, 1,6-hexanediol, and combinations thereof.

As noted above, the detailing agent 137 may also include anti-kogation agent(s) and/or biocide(s). Examples of anti-kogation agents include oleth-3-phosphate (e.g., CRODAFOS® N3 Acid from Croda) and a metal chelator, such as methylglycinediacetic acid (e.g., TRILON® M from BASF Corp.). Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methyl isothiazolone (e.g., KORDEK® MLX from The Dow Chemical Co.). When included, the anti-kogation agent may be present in an amount ranging from about 0.5 wt % to about 1.5 wt %, and the biocide may be present in an amount ranging from about 0.05 wt % to about 2.0 wt %, each of which is with respect to the total weight of the detailing agent 137.

The balance of the detailing agent 137 is water. As such, the amount of water may vary depending upon the amounts of dye, surfactant, and co-solvent, and in some instances anti-kogation agent and/or biocide that are included.

The co-solvent and water of the detailing agent 137 provide evaporative cooling to the polymer build material 116 in proximity thereof (e.g., in thermal contact therewith). It is believed that evaporation of 1.3 milligrams per $cm^2$ of the detailing agent 137 can remove up to 3 Joules of energy per $cm^2$ of the polymer build material 116. This energy loss is enough to keep the polymer build material 116 from heating and fusing at those portion(s) (240 as illustrated in FIG. 2C) where the detailing agent 137 is applied.

The applicator 124 may be scanned across the build area platform 112 in the direction indicated by the arrow 126, for instance, along the y-axis. The applicator 124 may be, for instance, an inkjet applicator, such as a thermal inkjet printhead, a piezoelectric printhead, or a continuous inkjet printhead, and may extend a width of the build area platform 112. While the applicator 124 is shown in FIG. 1 as an individual applicator, it is to be understood that the applicator 124 may include multiple applicators that span the width of the build area platform 112. Additionally, the applicators 124 may be positioned in multiple printbars. The applicator 124 may also be scanned along the x-axis, for instance, in configurations in which the applicator 124 does not span the width of the build area platform 112 to enable the applicator 124 to deposit the fusing agent 136 and detailing agent 137 over a large area of a layer of the polymer build material 116. The applicator 124 may thus be attached to a moving XY stage or a translational carriage (neither of which is shown) that moves the applicator 124 adjacent to the build area platform 112 in order to deposit the fusing agent 136 and detailing agent 137 in predetermined areas of a layer of the polymer build material 116 that has been formed on the build area platform 112 in accordance with the method(s) disclosed herein. The applicator 124 may include a plurality of nozzles (not shown) through which the fusing agent 136 and the detailing agent 137 are to be ejected.

The applicator 124 may deliver drops of the fusing agent 136 and the detailing agent 137 at a resolution ranging from about 300 dots per inch (DPI) to about 1200 DPI. In some examples, the applicator 124 may deliver drops of the fusing agent 136 and the detailing agent 137 at a higher or lower resolution. The drop velocity may range from about 2 m/s to about 24 m/s and the firing frequency may range from about 1 kHz to about 100 kHz. In one example, each drop may be in the order of about 10 picoliters per drop, although it is contemplated that a higher or lower drop size may be used. For example, the drop size may range from about 1 picoliter to about 400 picoliters. In some examples, applicator 124 is able to deliver variable size drops of the fusing agent 136 and the detailing agent 137.

Each of the described physical elements may be operatively connected to a controller 128 of the printing system 100. The controller 128 may control the operations of the build area platform 112, the build material supply 114, the build material distributor 118, and the applicator 124. As an example, the controller 128 may control actuators (not shown) to control various operations of the 3D printing system 100 components. The controller 128 may be a computing device, a semiconductor-based microprocessor, a central processing unit (CPU), an application specific integrated circuit (ASIC), and/or another hardware device. Although not shown, the controller 128 may be connected to the 3D printing system 100 components via communication lines.

Figure 2F:
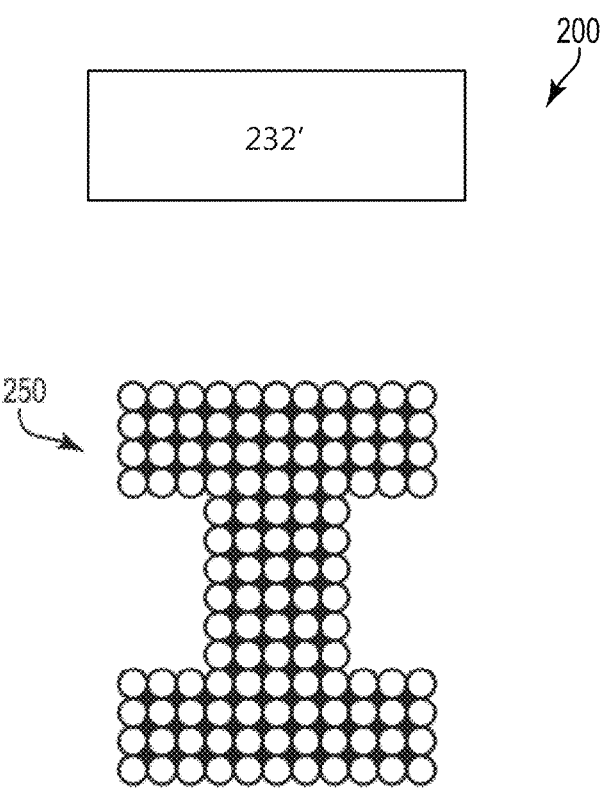

The controller 128 may manipulate and transform data, which may be represented as physical (electronic) quantities within the printing system's registers and memories, to control the physical elements to create the extracted fused 3D printed object 250 (As illustrated in FIG. 2F). As such, the controller 128 is depicted as being in communication with a data store 130. The data store 130 may include data pertaining to a fused 3D printed object to be printed by the 3D printing system 100. The data for the selective delivery of the polymer build material 116, the fusing agent 136, and the detailing agent 137 may be derived from a model of the fused 3D printed object to be formed. For instance, the data may include the locations on each layer of polymer build material 116 that the applicator 124 is to deposit the fusing agent 136 and the detailing agent 137. In one example, the controller 128 may use the data to control the applicator 124 to selectively apply the fusing agent 136 and the detailing agent 137. The data store 130 may also include machine readable instructions (stored on a non-transitory computer readable medium) that are to cause the controller 128 to control the amount of polymer build material 116 that is supplied by the build material supply 114, the movement of the build area platform 112, the movement of the build material distributor 118, or the movement of the applicator 124.

As depicted in FIG. 1, the printing system 100 may include a heater 132', 132. In some examples, the heater 132' includes a furnace or oven, a microwave, or devices capable of hybrid heating (i.e., convective/conductive heating and/or microwave heating). The heater 132' may be used for the patterned 3D printed object layer-by-layer, as described herein.

In some example, the patterned 3D printed object 242' can be exposed to heat such as heat provided by heater 132'. In some examples, the heater 132' may be a conductive heater or a radiative heater (e.g., infrared lamps, ultraviolet, or near-IR lamps, light emitting diodes (LED) or LED arrays, flash lamps or visible light sources) that is integrated into the system 100. These other types of heaters 132 may be placed below the build area platform 112 (e.g., conductive heating from below the platform 112) or may be placed above the build area platform 112 (e.g., radiative heating of the build material layer surface). Combinations of these types of heating may also be used. These other types of heaters 132 may be used throughout the 3D printing process. In some examples, heater 132 may be used to maintain a constant bed temperature. In some examples, heater 132 may be used to heat the build material supply 114 and the build area platform 112 during the build process. In still some examples, the heater 132' may be a radiative heat source that is positioned to heat each layer (e.g., layer 234 as depicted in FIG. 2C) after the fusing agent 136 and the detailing agent 137 have been applied thereto. As depicted in FIG. 1, the heater 132' can be attached to the side of the applicator 124, which allows for printing and heating in an individual pass. In some examples, both the heater 132 and the heater 132' may be used.

Referring now to FIGS. 2A through 2F, an example of the 3D printing method is depicted. Prior to execution of printing, the controller may access data stored in the data store pertaining to a fused 3D printed object 250 that is to be printed. The controller may determine the number of layers of polymer build material 216 that are to be formed, and the locations at which fusing agent 236 and the detailing agent 237 from the applicator 224 are to be deposited on each of the respective layers.

In FIG. 2A, the build material supply 214 may supply the polymer build material particles 216 into a position so that they are ready to be spread onto the build area platform 212. In FIG. 2B, the build material distributor 218 may spread the supplied polymer build material 216 onto the build area platform 212. The controller may execute control build material supply instructions to control the build material supply 214 to appropriately position the polymer build material 216, and may execute control spreader instructions to control the build material distributor 218 to spread the supplied polymer build material 216 over the build area platform 212 to form a layer 234 of polymer build material 216 thereon. As shown in FIG. 2B, one layer 234 of the polymer build material 216 has been applied.

The layer 234 has a substantially uniform thickness across the build area platform 212. In an example, the thickness of the layer 234 ranges from about 30 μm to about 300 μm, although thinner or thicker layers may also be used. For example, the thickness of the layer 234 may range from about 20 μm to about 500 μm. The layer thickness may be about 2× (i.e., 2 times) the particle diameter (as shown in FIG. 2B) at a minimum for finer part definition. In some examples, the layer thickness may be about 1.2× (i.e., 1.2 times) the particle diameter.

Referring now to FIG. 2C, selectively applying the fusing agent 236 on a portion 238 of the polymer build material 216 and selectively applying the detailing agent 237 on a portion 240 of the polymer build material 216 continues. As illustrated in FIG. 2C, the fusing agent 236 and the detailing agent 237 may be dispensed from the applicator 224. The applicator 224 may be a thermal inkjet printhead, a piezo-electric printhead, or a continuous inkjet printhead, and the selectively applying of the fusing agent 236 and the detailing agent 237 may be accomplished by the associated inkjet printing technique. As such, the selectively applying of the fusing agent 236 and the detailing agent 237 may be accomplished by thermal inkjet printing or piezo-electric inkjet printing.

The controller (e.g., controller 128 as illustrated in FIG. 1) may execute instructions to control the applicator 224 (e.g., in the directions indicated by the arrow 226) to deposit the fusing agent 236 onto predetermined portion(s) 238 of the polymer build material 216 that are to become part of a patterned 3D printed object 242' and are to ultimately be fused to form the extracted fused 3D printed object 250, as described herein. Similarly, the controller may execute instructions to control the applicator 224 (e.g., in the directions indicated by the arrow 226) to deposit the detailing agent 237 onto predetermined portion(s) 240 of the polymer build material 216 that are to become part of an unpatterned polymer build material.

The applicator 224 may be programmed to receive commands from the controller to deposit the fusing agent 236 according to a pattern of a cross-section for the layer of the fused 3D printed object 242 that is to be formed. As used herein, the cross-section of the layer of the fused 3D printed object 242 to be formed refers to the cross-section that is parallel to the surface of the build area platform 212. In the example shown in FIG. 2C, the applicator 224 may selectively apply the fusing agent 236 on those portion(s) 238 of the layer 234 that are to be fused to become the first layer of the fused 3D printed object 242. As an example, if the 3D part that is to be formed is to be shaped like a cube or cylinder, the fusing agent 236 will be deposited in a square pattern or a circular pattern (from a top view), respectively, on at least a portion of the layer 234 of the polymer build material 216. In the example shown in FIG. 2C, the fusing agent 236 may be deposited in a square pattern on the portion 238 of the layer 234 and not on the portions 240.

Similarly, the applicator 224 may be programmed to receive commands from the controller to deposit the detailing agent 237 on the layer of polymer build material. In the example shown in FIG. 2C, the applicator 224 may selectively apply the detailing agent 237 on those portion(s) 240 of the layer 234 that do not become part of the fused 3D printed object 242 that is formed. As an example, if the 3D part that is to be formed is to be shaped like a cube or cylinder, the detailing agent 237 will be deposited around a square pattern or around a circular pattern (from a top view), respectively, on at least a portion of the layer 234 of the polymer build material 216. In the example shown in FIG. 2C, the detailing agent 237 may be deposited on the portion 240 of the layer 234 and not on the portion 238.

As mentioned above, the fusing agent 236 includes the IR absorbing pigment and the liquid vehicle. In some examples the fusing agent 236 also includes the co-solvent (as or in addition to the liquid vehicle). In such examples, the co-solvent plasticizes the polymer particles and enhances the coalescing of the polymer particles upon exposure to photonic energy in order to fuse the polymer build material particles 216 together to form the patterned 3D printed object 242'. In various examples, the co-solvent (e.g., water) makes up the balance of the fusing agent 236.

In some examples, the co-solvent may be a lactone, such as 2-pyrrolidinone or 1-(2-hydroxyethyl)-2-pyrrolidone. In some examples, the co-solvent may be a glycol ether or a glycol ether esters, such as tripropylene glycol mono methyl ether, dipropylene glycol mono methyl ether, dipropylene glycol mono propyl ether, tripropylene glycol mono n-butyl ether, propylene glycol phenyl ether, dipropylene glycol methyl ether acetate, diethylene glycol mono butyl ether, diethylene glycol mono hexyl ether, ethylene glycol phenyl ether, diethylene glycol mono n-butyl ether acetate, or ethylene glycol mono n-butyl ether acetate. In some examples, the co-solvent may be a water-soluble polyhydric alcohol, such as 2-methyl-1,3-propanediol. In some examples, the co-solvent may be a combination of any of the examples above. In some examples, the co-solvent is selected from the group comprising 2-pyrrolidinone, 1-(2-hydroxyethyl)-2-pyrrolidone, tripropylene glycol mono methyl ether, dipropylene glycol mono methyl ether, dipropylene glycol mono propyl ether, tripropylene glycol mono n-butyl ether, propylene glycol phenyl ether, dipropylene glycol methyl ether acetate, diethylene glycol mono butyl ether, diethylene glycol mono hexyl ether, ethylene glycol phenyl ether, diethylene glycol mono n-butyl ether acetate, ethylene glycol mono n-butyl ether acetate, 2-methyl-1,3-propanediol, and a combination thereof.

The co-solvent may be present in the fusing agent 236 in an amount ranging from about 0.1 wt % to about 50 wt %, or from about 1.0 wt % to about 40 wt %, or from about 10 wt % to about 30 wt % (based upon the total weight of the fusing agent 236). In some examples, greater or lesser amounts of the co-solvent may be used depending, in part, upon the application architecture of the applicator 224.

When the fusing agent 236 is selectively applied in the targeted portion(s) 238, the fusing agent 236 selectively applied to the polymer build material 216 absorbs the heat emitted from the heater 232', increasing the temperature of the polymer build material 216 and the fusing agent 236. The increase in temperature may cause the polymer build material particles 216 to fuse. The fusing of the polymer build material may cause the interstitial spaces to fill.

It is to be understood that portions 240 of the polymer build material 216 do not receive the fusing agent 236 applied thereto and do not become part of the patterned 3D printed object 242' that is ultimately formed.

The processes shown in FIGS. 2A through 2C may be completed and repeated to iteratively build up several patterned layers and to form the patterned 3D printed object 242'.

FIG. 2D illustrates the initial formation of a second layer of polymer build material 216 on the layer 234 patterned with fusing agent 236 and detailing agent 237. In FIG. 2D, following deposition of the fusing agent 236 and the detailing agent 237 onto the layer 234 of polymer build material 216, the controller may execute instructions to cause the build area platform 212 to be moved a relatively small distance in the direction denoted by the arrow 220. In other words, the build area platform 212 may be lowered to enable the next layer of polymer build material 216 to be formed. For example, the build material platform 212 may be lowered a distance that is equivalent to the height of the layer 234. In addition, following the lowering of the build area platform 212, the controller may control the build material supply 214 to supply additional polymer build material 216 (e.g., through operation of an elevator, an auger, or the like) and the build material distributor 218 to form another layer of polymer build material 216 on top of the previously formed layer 234 with the additional polymer build material 216. The newly formed layer may be patterned with the fusing agent 236. Similarly, the detailing agent 237 may be deposited on the newly formed layer.

Referring back to FIG. 2C, the layer 234 may be exposed to heating using heater 232' after and/or during the depositing of the fusing agent 236 and the detailing agent 237 to the layer 234 and before another layer is formed. The heater 232' may be used during printing on a layer-by-layer basis. In this example, the processes shown in FIGS. 2A through 2C (including the heating/fusing of the layer 234) may be repeated to iteratively build up several layers and to produce the fused 3D printed object 242. It will be understood that the heaters 232', 232 can be one or both or a combination of overhead lamp(s) and/or lamps attached to moving carriage(s) (not all options are shown in the figures).

The cycle time when printing layer-by-layer can range from about 5 seconds to about 100 seconds. In some examples, the cycle time when printing layer-by-layer is at least 10 seconds. During this time, a layer of polymer build material 234 is formed, fusing agent 236 and the detailing agent 237 are delivered to the layer, and heaters 232', 232 heat the surface of the polymer build material to a fusing temperature that fuses the polymer build material with selectively applied fusing agent 236 into the fused 3D printed object 242.

In some examples, layers of polymer build material 216 and fusing agent 236 can be heated and fused on a layer-by-layer basis. It is understood that fusing occurs on a layer by layer basis. However, heat can be applied on a layer-by-layer basis, every two layers, every three layers, or so forth to form the fused 3D printed object 242.

The patterned 3D printed object 242' is a volume of the build material cake 244 that is filled with the polymer build material 216 and the fusing agent 236. The remainder of the build material cake 244 is made up of the unpatterned polymer build material 216.

As shown in FIG. 2E, the polymer build material 216 and fusing agent 236 may be exposed to heat or radiation to generate heat, as denoted by the arrows 246. The heat applied may be sufficient to melt the polymer build material 216 and the fusing agent 236 into the patterned 3D printed object 242' and to produce a fused 3D printed object 242.

Heating the patterned 3D printed object 242' above the melt temperature or to a fusing temperature may result in the evaporation of a significant fraction and in some instances all of the liquid from the patterned 3D printed object 242'. The evaporated liquid may include any of the fusing agent components. Liquid evaporation may result in some densification, through capillary action, of the patterned 3D printed object 242'.

Once fused, the fused 3D printed object 242 may then be extracted from the build material cake 244 to provide the extracted fused 3D printed object 250 (as illustrated in FIG. 2F). The fused 3D printed object 242 may be extracted by other means. In an example, the fused 3D printed object 242 may be extracted by lifting the fused 3D printed object 242 from the unpatterned polymer build material 216. An extraction tool including a piston and a spring may be used.

In some examples, the fused 3D printed object 242 may be cleaned to remove unpatterned polymer build material 216 from its surfaces. In some examples, the fused 3D printed object 242 may be cleaned with a brush and/or an air jet. Some examples of cleaning procedures include rotary tumbling or vibratory agitation, ultrasonic agitation in a liquid, and/or bead blasting, among others.

During fusing using heat 246 from heat source 232', the particles from the polymer build material may become fused and therefore form a fused 3D printed object 242. That is, fusing the polymer build material 216 with heat, is accomplished at a fusing temperature that is sufficient to fuse the particles in the polymer build material 216. The fusing temperature is highly dependent at least upon the composition/particle size of the polymer build material 216 and on the composition of the fusing agent. During heating/fusing, the fused 3D printed object 242 and/or the patterned 3D printed object 242' may be heated to a temperature above the melting point or the liquidus, or peritectic temperature of the polymer build material 216.

As detailed herein, a fusing temperature can be a temperature in a range of from about 80° C. to about 350° C. It is to be understood that the fusing temperature depends upon the polymer build material 216 that is utilized, and may be higher or lower than the described examples. Heating at a fusing temperature fuses at least the particles in the polymer build material 216 to form a completed fused 3D printed object 242. For example, as a result of fusing, the density may go from 50% density to over 90%, and in some cases very close to 100% of the theoretical density.

Figure 3:
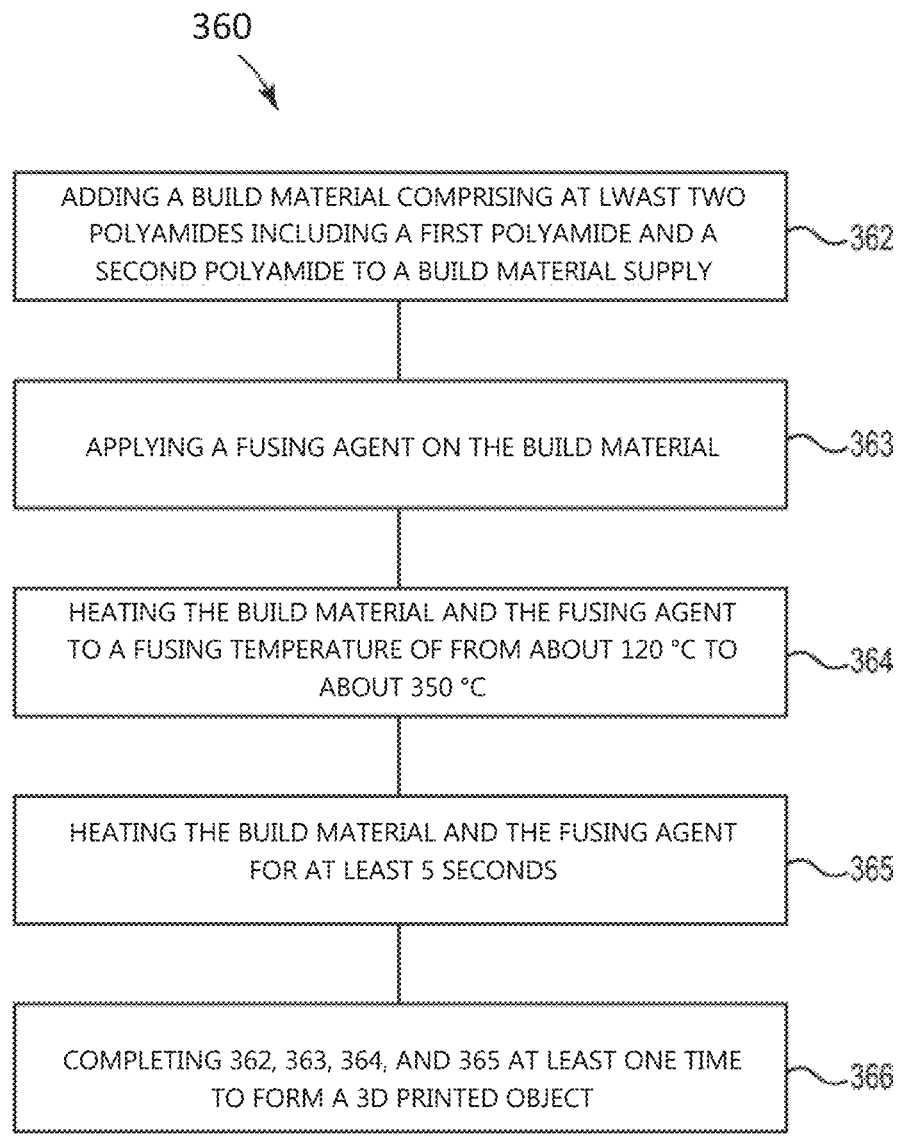
FIG. 3 is a flow diagram illustrating an example of a 3D printing method disclosed herein.

FIG. 3 is a flow diagram illustrating an example of a 3D printing method 360 disclosed herein. In this example, the method 360 of printing a 3D printed object can comprise adding a polymer build material comprising at least two polyamides including a first polyamide and a second polyamide to a build material supply (362); selectively applying a fusing agent on the build material (363); heating the build material and the selectively applied fusing agent to a fusing temperature of from about 120° C. to about 350° C. (364); heating the build material and selectively applied fusing agent for at least 5 seconds (365); and completing (and in some examples repeating) 362, 363, 364, and 365 at least one time to form the 3D printed object (366), as detailed herein.

Figure 4:
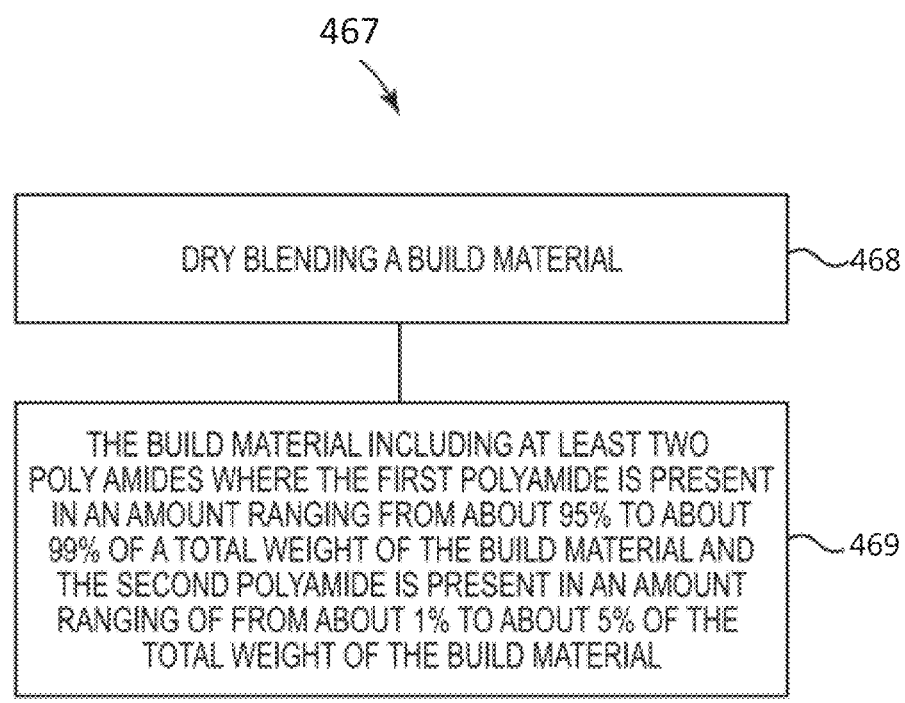
FIG. 4 is a flow diagram illustrating an example of a method for making a composition for three-dimensional (3D) printing disclosed herein.

FIG. 4 is a flow diagram illustrating an example of a method 470 for making a composition for three-dimensional (3D) printing disclosed herein. In this example, the method 467 of making a composition for three-dimensional (3D) printing can comprise dry blending a polymer build material (468) including at least two polyamides where the first polyamide is present in an amount ranging of from about 95% to about 99% of a total weight of the polymer build material and the second polyamide is present in an amount ranging of from about 1% to about 5% of the total weight of the polymer build material (469), as detailed herein.

Unless otherwise stated, any feature described hereinabove can be combined with any example or any other feature described herein.

In describing and claiming the examples disclosed herein, the singular forms "a," "an," and "the" include plural referents unless the context clearly dictates otherwise.

It is to be understood that the ranges provided herein include the stated range and any value or sub-range within the stated range. For example, from about 0.5% to about 3% should be interpreted to include other limits other than the explicitly recited limits of from about 0.5% to about 3%, but also to include individual values, such as about 0.8%, about 1.31%, about 2%, about 2.785%, about 2.95%, etc., and sub-ranges, such as from about 0.85% to about 2.35%, from about 1.21% to about 2.95%, from about 1.5% to about 2.35%, etc. Furthermore, when "about" is utilized to describe a value, this is meant to encompass minor variations (up to +/−10%) from the stated value.

Reference throughout the specification to "one example," "some examples," "another example," "an example," and so forth, means that a particular element (e.g., feature, structure, and/or characteristic) described in connection with the example is included in at least one example described herein, and may or may not be present in some examples. In addition, it is to be understood that the described elements for any example may be combined in various manners in the various examples unless the context clearly dictates otherwise.

Unless otherwise stated, references herein to "wt %" of a component are to the weight of that component as a percentage of the whole composition comprising that component. All amounts disclosed herein and in the examples below are in wt % unless indicated otherwise.

If a standard test is mentioned herein, unless otherwise stated, the version of the test to be referred to is the most recent at the time of filing this patent application. To further illustrate the present disclosure, examples are given herein. It is to be understood that these examples are described for illustrative reasons and are not to be construed as limiting the scope of the present disclosure.

Described herein, in some examples, is a method of printing a three-dimensional (3D) object, the method comprising (A) adding a polymer build material comprising at least two polyamides including a first polyamide and a second polyamide to a build material supply,
wherein the first polyamide is polyamide 12 and present in an amount ranging of from about 95% to about 99% of a total weight of the polymer build material; and wherein the second polyamide is polyamide 11 and present in an amount ranging of from about 1% to about 5% of the total weight of the polymer build material.

In some examples, is a method of printing a three-dimensional (3D) object, the method comprising
(A) adding a polymer build material comprising at least two polyamides including a first polyamide and a second polyamide to a build material supply, wherein the first polyamide is polyamide 12 and present in an amount ranging of from about 95% to about 99% of a total weight of the polymer build material; and
wherein the second polyamide is polyamide 11 and present in an amount ranging of from about 1% to about 5% of the total weight of the polymer build material;
(B) selectively applying a fusing agent on the polymer build material;
(C) heating the build material and the selectively applied fusing agent to a fusing temperature ranging of from about 120° C. to about 350° C.;
(D) heating the build material and the selectively applied fusing agent for at least 5 seconds; and
(E) repeating (A), (B), (C), and (D) at least one time to form a 3D printed object.

In some examples, the fusing temperature is from about 80° C. to about 350° C., 80° C. to about 205° C., 80° C. to about 200° C., or about 120° C. to about 350° C., or from about 120° C. to about 275° C., or from about 120° C. to about 250° C., or from about 120° C. to about 240° C., or from about 120° C. to about 230° C., or from about 120° C. to about 220° C., or from about 130° C. to about 210° C., or from about 140° C. to about 210° C., or from about 150° C. to about 200° C., or from about 160° C. to about 200° C., or more than about 160° C., or more than about 170° C., or more than about 180° C., or more than about 190° C., or more than about 200° C., or at least about 150° C., or at least about 180° C., or at least about 190° C., or at least about 200° C.

In some examples, the melt temperature is from about 90° C. to about 300° C., or from about 90° C. to about 250° C., or from about 90° C. to about 200° C., or from about 90° C. to about 170° C., or from about 175° C. to about 300° C., or from about 180° C. to about 300° C., or from about 190° C. to about 300° C., or from about 175° C. to about 189° C., or from about 200° C. to about 250° C., or less than about 250° C., or less than about 240° C., or less than about 210° C., or less than about 200° C.

In some examples, (C) heating occurs in an ambient environment. However, in some examples, (C) heating occurs in an environment containing (i) a vacuum or (ii) an inert gas, a low reactivity gas, a reducing gas, or a combination thereof. The inert gas, low reactivity gas, and reducing gas can include but are not limited to helium, argon, neon, xenon, krypton, nitrogen, hydrogen, carbon monoxide and combinations thereof.

To further illustrate the present disclosure, examples are given herein. It is to be understood these examples are provided for illustrative purposes and are not to be construed as limiting the scope of the disclosure.

EXAMPLES

Example 1

Example 3D printed object were printed using a polymer build material and a fusing agent. The polymer build material used to print the 3D printed object have the components as shown in Table 1, with the wt % of each component that was used.

TABLE 1

| Components | Example polymer build material (wt %) |
| --- | --- |
| Polyamide 12 | 95% |
| Polyamide 11 | 5% |

The fused 3D printed objects were formed by successively spreading 80 μm thick layers of polymer build material, followed by depositing printed areas with the fusing agent and non-printed areas with detailing agent. The fusing agent were applied by thermal inkjet, using 1-10 pass printing per layer, and after application the entire layer fused. The bottom surface of the polymer bed was maintained at ~165° C. by resistive heaters, and surface temperature of the build layers maintained between 90° C.-165° C. Consecutive layers were printed and then fused through the application of radiation via overhead halogen lamps. The 3D printed object was then extracted from the unpatterned polymer build material and cleaned of unfused polymer material. No further processing was performed. While the fusing agents were applied by thermal inkjet, other forms of agent delivery, such as piezoelectric inkjet or continuous inkjet, could be employed. Fused 3D printed objects with a thickness of approximately 4 millimeters were formed in accordance with the procedure above.

The polymer build material was formed by dry blending a powder form of polyamide 12 and a powder form of polyamide 11 in the amounts described above. Polyamide 12 powder and polyamide 11 powder were placed in a mixing barrel and mixed together. The Polyamide 12 powder and polyamide 11 powder were mixed for approximately 2 hours to create a homogenize mixture.

Comparative Examples 1-5

Example 3D printed objects and fused 3D printed objects were printed using the methodology of Example 1 but instead employed the polymer build material of Comparative Examples 1-5 having the properties as shown in Table 2.

TABLE 2

|  | Example (WE) 1 | Comparative Example (CE) 1 | CE 2 | CE 3 | CE 4 | CE 5 |
| --- | --- | --- | --- | --- | --- | --- |
| wt % Polyamide 12 | 95% | 100% | 90% | 80% | 70% | 50% |
| wt % Polyamide 11 | 5% | 0% | 10% | 20% | 30% | 50% |
| Annealing temperature (° C.) | 165° C. | 165° C. | 165° C. | 165° C. | 165° C. | 165° C. |
| Annealing time (hr) | 0, 0.5, 1, 15 | 0, 0.5, 1, 15 | 0, 0.5, 1, 15 | 0, 0.5, 1, 15 | 0, 0.5, 1, 15 | 0, 0.5, 1, 15 |

Figure 5:
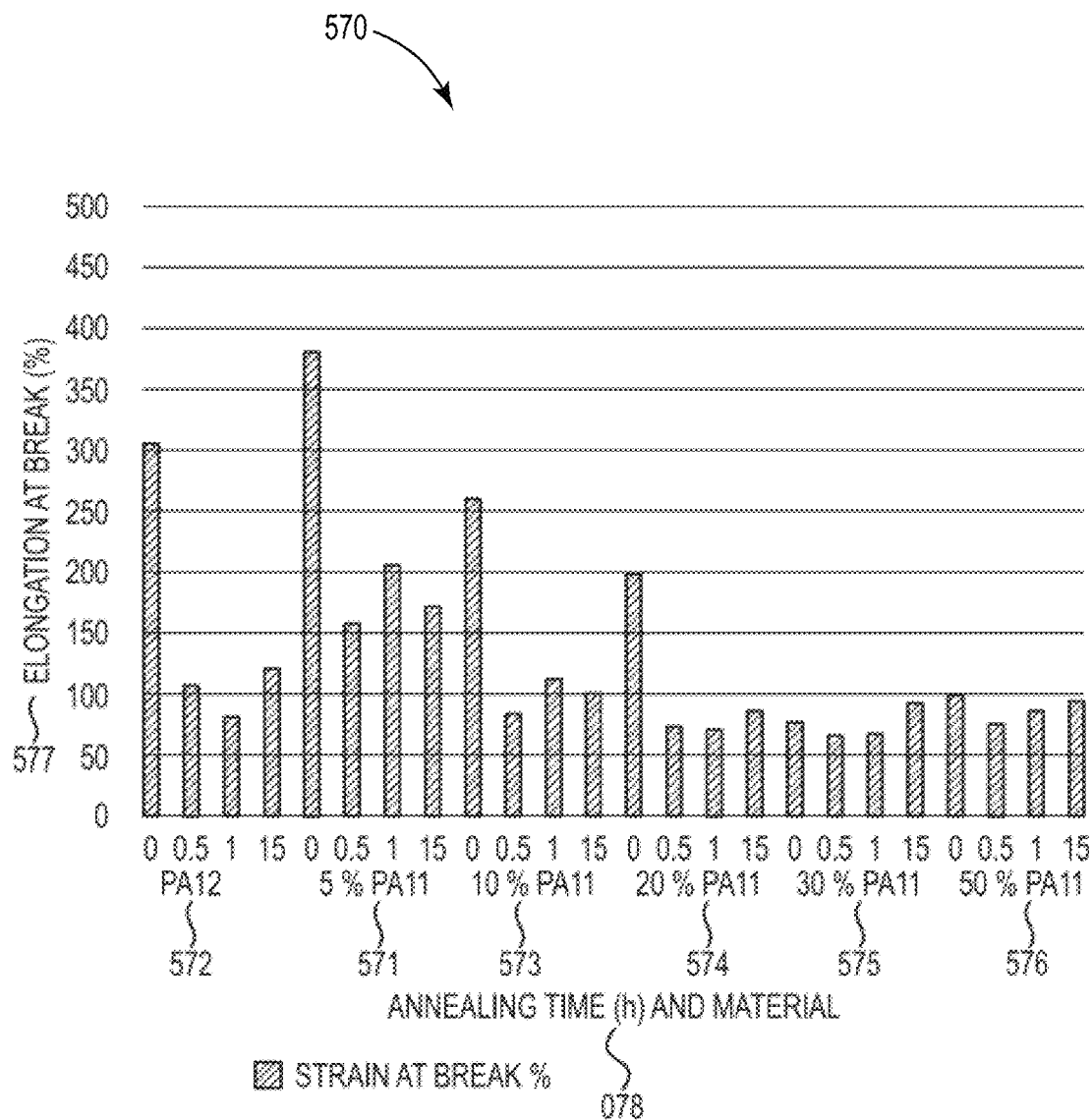
FIG. 5 is a graph illustrating the elongation at break of 3D printed objects using various polymer build materials.

FIG. 5 is a graph 570 illustrating the elongation at break of 3D printed objects using various polymer build materials, including Example 1. The percent of the elongation at break of 3D printed objects printed with the polymer build material of Example 1 and the polymer build material in the Comparative Examples were tested. The percent of the elongation at break is listed on the y-axis (577) and the annealing time and material is listed on the x-axis (578). The 3D objects were annealed at a temperature of at least 165° C. for 0 hours, 0.5 hours, 1 hour, and 15 hours. Annealing was conducted in a convective oven.

FIG. 5 demonstrates that Example 1 (571) exhibits a higher strain at break than the Comparative Examples (572, 573, 574, 575, and 576) at 0 hour, 0.5 hours, 1 hour, and 15 hours of annealing time. Example 1 exhibited a strain at break of greater than 375% at 0 hours of annealing time, greater than 150% at 0.5 hours of annealing time, of greater than 200% at 1 hour of annealing time, and greater than 170% at 15 hours of annealing time.

Figure 6:
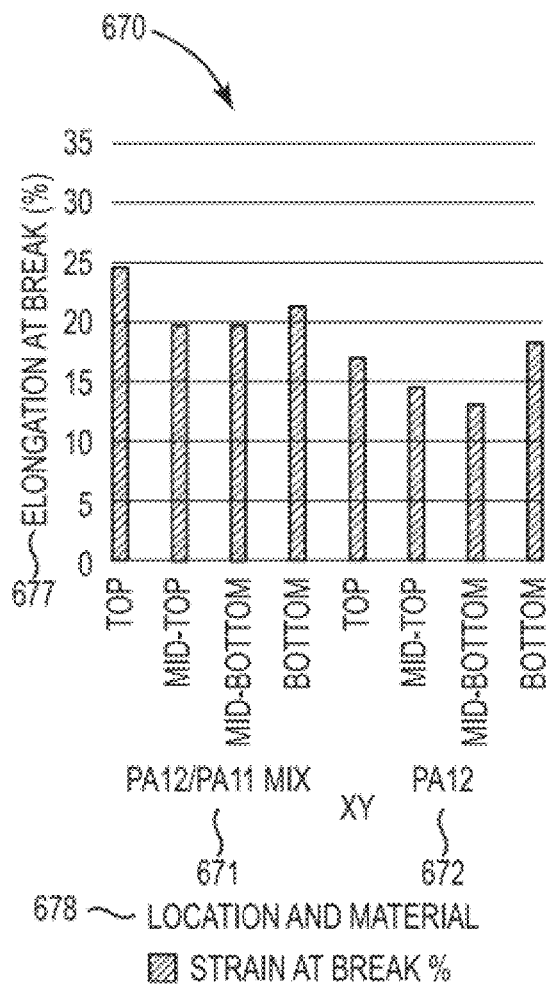
FIG. 6 is a graph illustrating the elongation at break of 3D printed objects using various polymer build materials in the xy print orientation.

FIG. 6 is a graph 670 illustrating the elongation at break of a 3D printed objects using various polymer build materials in the xy print orientation, including Example 1. The percentage of the elongation at break of 3D printed objects printed with the polymer build material of Example 1 and the polymer build material in Comparative Example 1 were tested. The percent of the elongation at break is listed on the y-axis (677) and the location and material is on the x-axis (678). The percentage of the elongation at break of the 3D printed objects were tested on 3D printed objects printed in different locations of the build platform (e.g., top, mid-top, mid-bottom, and bottom). The location in the build platform determines the thermal environment and the time the 3D printed object spends in the build platform after being printed. The 3D printed objects were annealed at elevated temperature of from about 165° C. for several hours in a 3D printer.

FIG. 6 demonstrates that Example 1 (671) exhibits a higher strain at break than Comparative Example 1 (672). Example 1 (671) exhibited a strain at break of greater than 24% for 3D printed parts printed in the top of the build platform, greater than 19% for 3D printed parts printed in the mid-top of the build platform, greater than 19% for 3D printed parts printed in the mid-bottom of the build platform, and greater than 21% for 3D printed parts printed in the bottom of the build platform.

Figure 7:
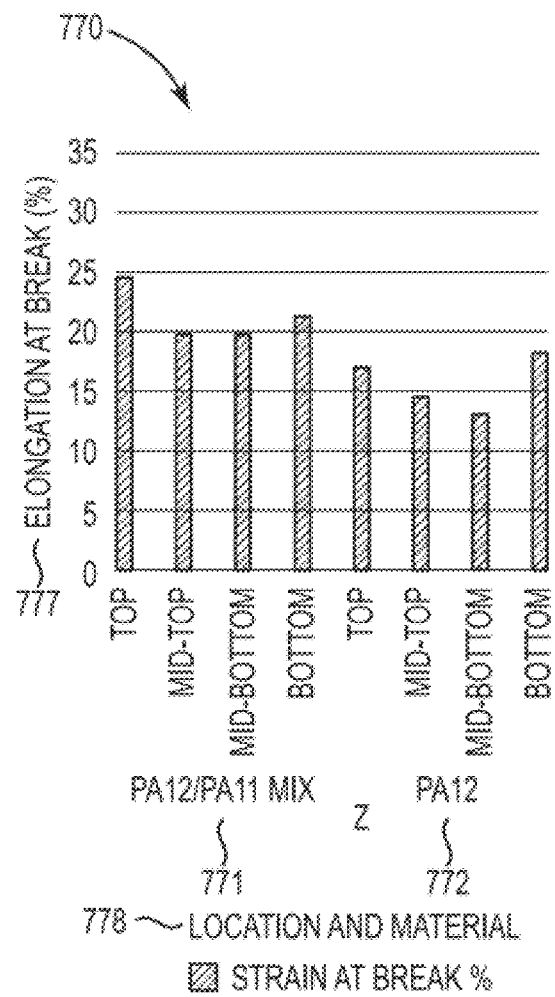
FIG. 7 is a graph illustrating the elongation at break of 3D printed objects using various polymer build materials in the z print orientation.

FIG. 7 is a graph 770 illustrating the elongation at break of a 3D printed objects using various polymer build materials in the z print orientation, including Example 1. The percentage of the elongation at break of 3D printed objects printed with the polymer build material of Example 1 and the polymer build material in the Comparative Example 1 were tested. The percent of the elongation at break is listed on the y-axis (777) and the location and material is listed on the x-axis (778). The percentage of the elongation at break of the 3D printed objects were tested on 3D printed objects printed in different locations of the build platform (e.g., top, mid-top, mid-bottom, and bottom). The location in the build platform determines the thermal environment and the time the 3D printed object spends in the build platform after being printed. The 3D printed objects were annealed at elevated temperature of from about 165° C. for several hours in a 3D printer.

FIG. 7 demonstrates that Example 1 (771) exhibits a higher strain at break than Comparative Example 1 (772). Example 1 (771) exhibited a strain at break of greater than 16% for 3D printed parts printed in the top of the build platform, greater than 14% for 3D printed parts printed in the mid-top of the build platform, greater than 14% for 3D printed parts printed in the mid-bottom of the build platform, and greater than 14% for 3D printed parts printed in the bottom of the build platform.

Figure 8:
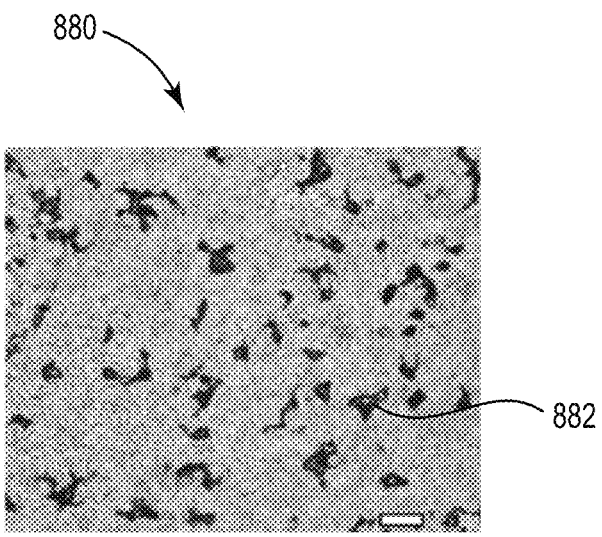
FIG. 8 is a microscopic image with crossed polarized lenses of a polymer build material comprising polyamide 12 and polyamide 11 taken at 100× magnification.

FIG. 8 is a microscopic image 880 with crossed polarized lenses of the polymer build material taken at 100× (100 times) magnification. In the microscopic image 880, 200 micrometers (μm) of the polymer build material, Example 1, was placed on a glass slide and heated to 210° C. at a rate of 30° C./min until the polymer build material was completely melted. The polymer build material was then cooled to 175° C. at a rate of 30° C./min and then slowly cooled to room temperature at 0.2° C./min. This temperature profile is similar to the thermal profile during the printing process. The temperature profile also achieves high levels of crystallization similar to the printing process.

Figure 9:
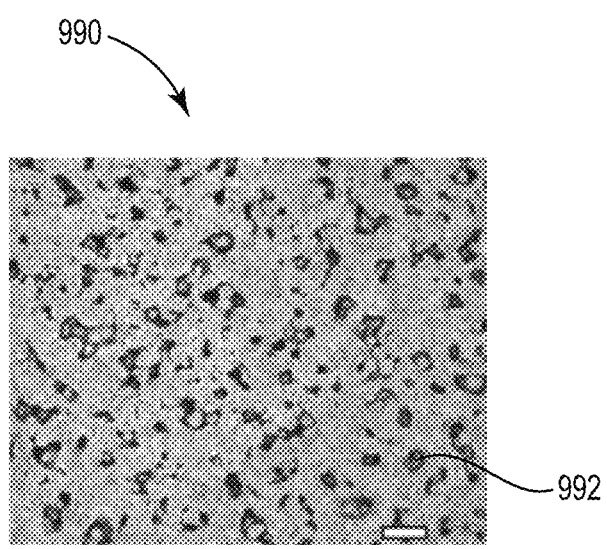
FIG. 9 is a microscopic image with crossed polarized lenses of a polymer build material comprising polyamide 12 taken at 100× magnification.

FIG. 9 is a microscopic image 990 with crossed polarized lenses of a polymer build material taken at 100× (100 times) magnification. In the microscopic image 990, 200 micrometers (μm) of the polymer build material in Comparative Example 1, was placed on a glass slide and heated to 210° C. at a rate of 30° C./min until the polymer build material of Comparative Example 1 was completely melted. The polymer build material of Comparative Example 1 was then cooled to 175° C. at a rate of 30° C./min.

Figure 10:
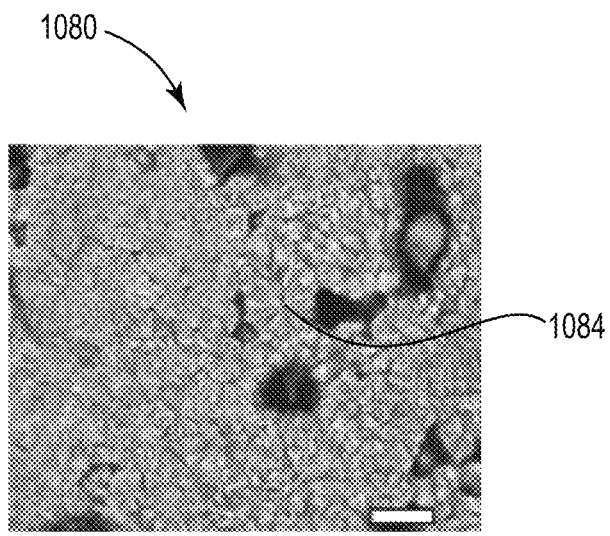
FIG. 10 is a microscopic image with crossed polarized lenses of a polymer build material comprising polyamide 12 and polyamide 11 taken at a magnification of taken at 500× magnification.

FIG. 10 is a microscopic image 1080 with crossed polarized lenses of the polymer build material taken at 500× (500 times) magnification. In the microscopic image 1080, 200 micrometers (μm) of the polymer build material, Example 1, was placed on a glass slide and heated to 210° C. at a rate of 30° C./min until the polymer build material was completely melted. The polymer build material was then cooled to 175° C. at a rate of 30° C./min.

Figure 11:
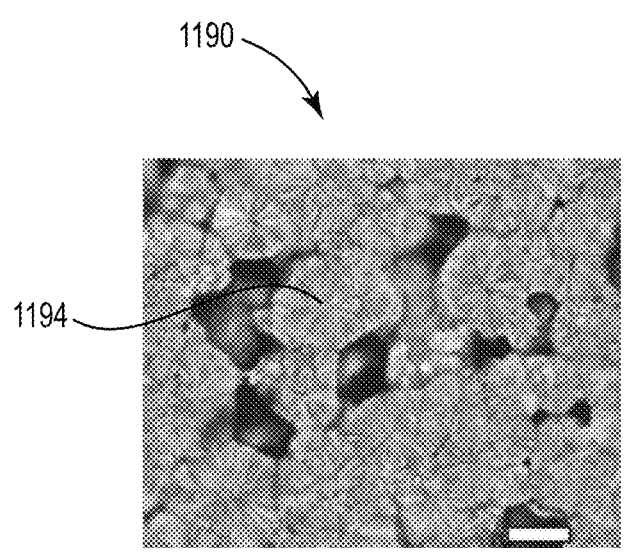
FIG. 11 is a microscopic image with crossed polarized lenses of a polymer build material comprising polyamide 12 taken at a magnification of taken at 500× magnification.

FIG. 11 is a microscopic image 1190 with crossed polarized lenses of a polymer build material taken at 500× (500 times) magnification. In the microscopic image 1190, 200 micrometers (μm) of the polymer build material in Comparative Example 1, was placed on a glass slide and heated to 210° C. at a rate of 30° C./min until the polymer build material of Comparative Example 1 was completely melted. The polymer build material of Comparative Example 1 was then cooled to 175° C. at a rate of 30° C./min.

Referring now to FIGS. 8 and 9, the microscopic image 880 of the polymer build material in Example 1 depicts voids 882 in FIG. 8. Similarly, the microscopic image 990 of the polymer build material in Comparative Example 1 depicts voids 992 in FIG. 9. FIG. 8 demonstrates that there are less voids 882 in the polymer build material of Example 1 in comparison to voids 992 of the polymer build material of Comparative Example 1 in FIG. 9. In some examples, a reduced amount of voids may indicate a reduced amount of shrinkage in the formation of the 3D printed object. In some examples, a reduced amount of voids may also indicate a diminished degree of crystallization which may reduce the embrittlement of a 3D printed object.

Referring now to FIGS. 10 and 11, the microscopic image 1080 of the polymer build material in Example 1 depicts spherulites 1084 in FIG. 10. Similarly, the microscopic image 1190 of the polymer build material in Comparative Example 1 depicts spherulites 1194 in FIG. 11. FIG. 10 demonstrates that the spherulites 1084 of the polymer build material in Example 1 are smaller in size in comparison to the spherulites 1194 of the polymer build material in Comparative Example 1 in FIG. 11. The average spherulite 1084 size of the polymer build material in Example 1 of FIG. 10 ranges between 15 to about 20 μm. However, the average spherulite 1194 size of the polymer build material in Comparative Example 1 of FIG. 11 is about 30 μm. As mentioned above, smaller spherulites may reduce embrittlement of the formed 3D printed object, creating more elastic properties.

Prophetic Examples 1-4 providing compositions for three-dimensional (3D) printing are prophetic. The difference between Prophetic Examples 1-4 and Example 1 is the composition of the polymer build material. Thus it is expected that Prophetic Examples 1-4 will yield similar characteristics as demonstrated by Example 1. As such, it is expected that the polymer build material of Prophetic Examples 1-4 would disrupt the material's crystal structure, reduce embrittlement, and increase the strain at break.

Prophetic Example 1

Repeat the procedure in Example 1, except instead of using 5% of polyamide 11 and 95% of polyamide 12 to make up the total weight of the build material, use 4% of polyamide 11 and 96% of polyamide 12 to make up the total weight of the build material.

Prophetic Example 2

Repeat the procedure in Example 1, except instead of using 5% of polyamide 11 and 95% of polyamide 12 to make up the total weight of the build material, use 3% of polyamide 11 and 97% of polyamide 12 to make up the total weight of the build material.

Prophetic Example 3

Repeat the procedure in Example 1, except instead of using 5% of polyamide 11 and 95% of polyamide 12 to make up the total weight of the build material, use 2% of polyamide 11 and 98% of polyamide 12 to make up the total weight of the build material.

Prophetic Example 4

Repeat the procedure in Example 1, except instead of using 5% of polyamide 11 and 95% of polyamide 12 to make up the total weight of the build material, use 1% of polyamide 11 and 99% of polyamide 12 to make up the total weight of the build material. While several examples have been described in detail, it is to be understood that the disclosed examples may be modified. Therefore, the foregoing description is to be considered non-limiting. As used herein, "(s)" at the end of some terms indicates that those terms/phrases may be singular in some examples or plural in some examples. It is to be understood that the terms without "(s)" may be also be used singularly or plurally in many examples.

What is claimed is:

1. A method of printing a three-dimensional (3D) object, the method comprising:
   (A) adding a build material comprising an amount of polyamide 12 and an amount of polyamide 11 to a build material supply, wherein the amount of polyamide 12 is from about 95 percent (%) to about 99% of a total weight of the build material and the amount of the polyamide 11 is from about 1% to about 5% of the total weight of the build material,
   wherein an average spherulites size in the 3D printed object is less than 30 micrometers (μm).

2. The method of claim 1, further comprising:
   (B) selectively applying a fusing agent on the build material.

3. The method of claim 2, further comprising:
   (C) heating the build material and the selectively applied fusing agent to a fusing temperature ranging of from about 120 Celsius (° C.) to about 350° C.

4. The method of claim 3, further comprising:
   (D) heating the build material and the selectively applied fusing agent for at least 5 seconds; and
   (E) repeating (A), (B), (C), and (D) at least one time to form the 3D printed object.

5. The method of claim 1, wherein a melt temperature of the build material is a temperature in a range from about 175 Celsius (° C.) to about 300° C.

6. The method of claim 1, wherein the total weight of the build material is made up of the polyamide 12 and the polyamide 11.

7. The method of claim 1, wherein the average spherulite size in the 3D printed object ranges from about 15 μm to about 20 μm.

8. The method of claim 1, wherein the polyamide 12, the polyamide 11, or both are semi-crystalline.

9. A method of printing a three-dimensional (3D) object, the method comprising:
   (A) spreading a build material comprising an amount of polyamide 12 and an amount of polyamide 11 to form a layer of the build material on a platform, wherein the amount of polyamide 12 is from 95 percent (%) to 99% of a total weight of the build material and the amount of the polyamide 11 is from 1% to 5% of the total weight of the build material; and
   (B) selectively applying a fusing agent on a first portion of the layer of build material,
   wherein an average spherulite size in the 3D printed object is less than 30 micrometers (μm).

10. The method of claim 9, further comprising selectively applying the fusing agent by a thermal inkjet, a piezoelectric inkjet, or a continuous inkjet.

11. The method of claim 9, further comprising selectively applying the fusing agent by a thermal inkjet.

12. The method of claim 9, further comprising applying a detailing agent on a second portion of the layer of build material.

13. The method of claim 9, further comprising:
   (C) heating the build material and the selectively applied fusing agent to a fusing temperature ranging of from about 120° C. to about 350° C.;
   (D) heating the build material and the selectively applied fusing agent for at least 5 seconds; and
   (E) repeating (A), (B), (C), and (D) at least one time to form the 3D printed object.

14. The method of claim 9, wherein the spreading includes spreading the build material across the platform with a build material distributor.

15. The method of claim 14, wherein the build material distributor comprises a blade, a roller, or a combination of the roller and the blade.

16. The method of claim 9, wherein the total weight of the build material is made up of the polyamide 12 and the polyamide 11.

17. The method of claim 9, wherein the average spherulite size in the 3D printed object ranges from about 15 μm to about 20 μm.

18. The method of claim 9, wherein the polyamide 12, the polyamide 11, or both are semi-crystalline.

* * * * *